Oct. 23, 1951  W. A. WEST  2,572,790
FISHING FLOAT
Filed July 7, 1949

William A. West
INVENTOR.

BY

Patented Oct. 23, 1951

2,572,790

UNITED STATES PATENT OFFICE 2,572,790

FISHING FLOAT

William A. West, Hume, Mo.

Application July 7, 1949, Serial No. 103,441

1 Claim. (Cl. 43—44.92)

The present invention relates, generically speaking, to certain new and useful improvements in fishing tackle characterized by a unique combination of accessories in which anglers will find their needs fully met, contained and reliably available.

More specifically, my invention has to do with an orderly combination of facilities on a casting line and in which chief novelty has to do with a float, preferably an adjustable float, mounted on the line inwardly of the fishing hook, and a slidable sinker on the line between the float and rod, whereby, during casting, the float serves as a combined stop and buffer for the sinker, allowing the sinker to carry the line out to a wanted fishing spot, after which the sinker goes to the bottom and constitutes an anchor for the float and hook-equipped end of the line.

A slidable sinker, as such, is not broadly new. Therefore, novelty, in addition to the above, is predicated upon a specifically new style of sinker which takes the form of a lead or equivalent sleeve having an appropriately shaped bushing which minimizes wear on the line.

I am also conversant with the state of the art to the extent that I realize that adjustable floats are not new, broadly speaking. Therefore, in reducing to practice the instant invention, I have evolved and produced a structurally distinct float possessed of refinements and distinctions which, to my mind, enable the float to better fulfill the purposes to be served.

Summarizing my objectives, it will be seen that the sequential order of attaching or mounting the float and sinker on the line in relation to the rod at one end and the hook at the other end is productive of improved fishing tackle; that the individual devices, the float, on the one hand, and the sinker, on the other hand, are singly and collectively novel.

Other objects and advantages will become more readily apparent from the following description and the accompanying illustrative drawing.

In the accompanying sheet of drawings, wherein like numerals are employed to designate like elements throughout the views.

Figure 1:
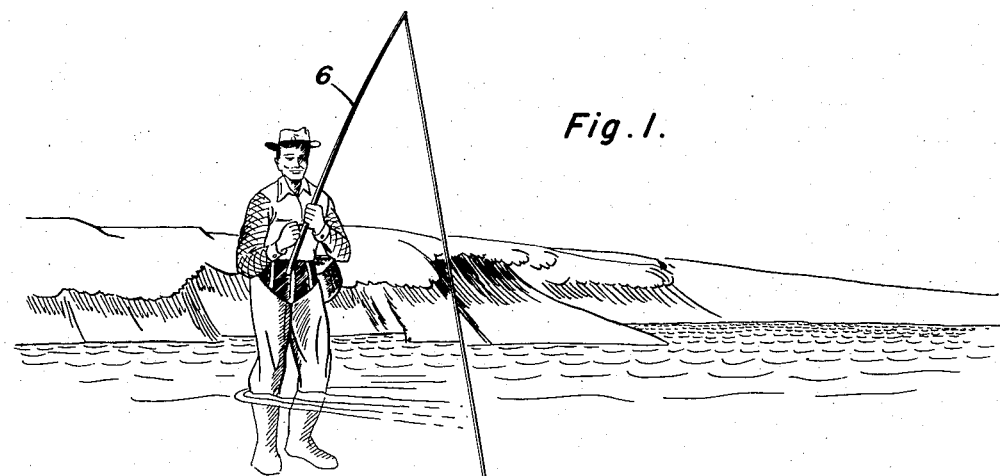
Fig. 1 is a perspective view, of a panoramic type, showing fishing tackle constructed in accordance with the principles of the invention and illustrating the manner in which same is commonly used.

Referring now to the drawings by distinguishing reference numerals and lead lines and observing Fig. 1, the numeral 6 designates a pole or rod of a rod and reel assembly and 7 denotes the fishing line which is attached at one end to the rod and provided at its opposite free end with suitable fish-hook means 8. The water line is denoted at 9 and the bottom or ground is denoted by the numeral 10.

Figure 2:
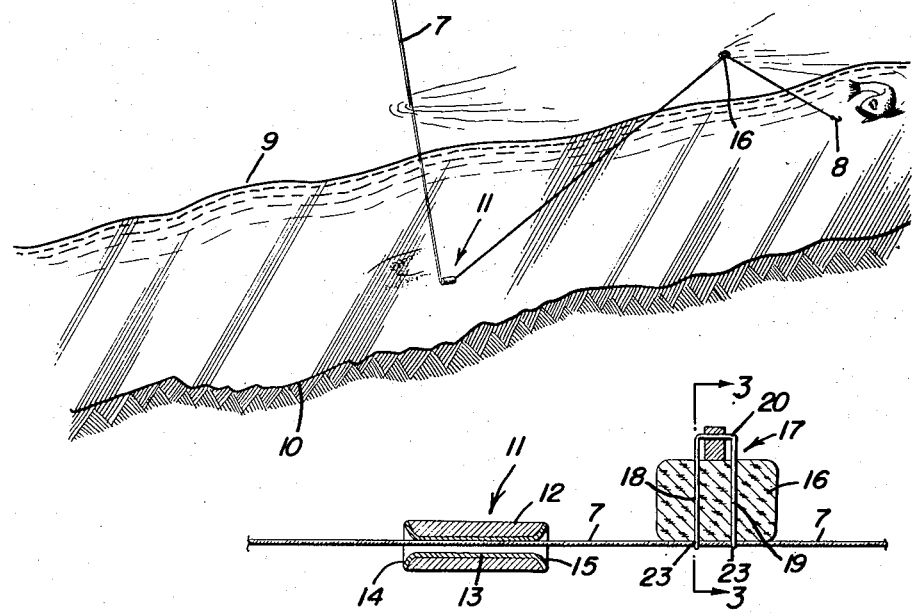
Fig. 2 is a view showing a fragmentary portion of the line in elevation and the improved float and sinker in relative positions and in section.

Referring now to Fig. 2, the sinker or weight is denoted by the numeral 11 and comprises a cylindrical elongated sleeve of appropriate dimensions for intended purposes, said sleeve being denoted at 12 and preferably being of lead or an equivalent weighty material. The sleeve is counterbored at its opposite end and the main bore is lined with a copper or equivalent tube 13 which constitutes a bushing and allows free passage of the line subject to a minimum degree of wear. The opposite ends of the bushing are flared to provide bell-ends 14 and 15 which provide smooth surfaces allowing angling of the line while likewise reducing the likelihood of wear to a minimum.

Figure 3:
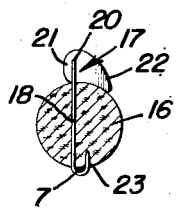
Fig. 3 is a vertical section on the line 3—3 of Fig. 2, looking in the direction of the arrows.
Figure 4:
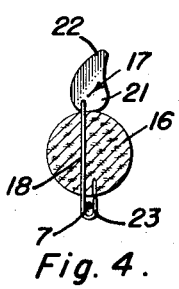
Fig. 4 is a view like Fig. 3 illustrating the manner in which the line fastening means is opened for adjustment of the float in relation to the line.

The float is denoted by the numeral 16 and is generally cylindrical in cross-sectional form and rests upon the line in the manner illustrated. The float may be of cork or any equivalent buoyant material. The fastener for the float comprises a wire or equivalent V-shaped bail 17 whose limbs 18 and 19 pierce and pass through diametrically opposite sides of the float. The bight portion is denoted at 20 and this serves as an appropriate mount for a cam latch 21 formed with a suitable finger piece 22. The cam is associable with the coacting curvate surface of the float, as shown in Figs. 3 and 4 and obviously serves to open and close the line grappling hooks 23 on the free ends of the limbs 18 and 19. The bill portions of the hook sink into sockets provided therefor in the float as brought out in Fig. 4. Thus, the line 7 is engaged with the hooks and the hooks are bound, by the clamping action of the cam latch, against the float, to thus securely fasten the float on the line. As stated, I am aware that adjustable floats are not broadly new, but a float of this particular type and characterized by the bail 17 and latch means 21 is structurally distinct and susceptible of performing the wanted results.

It will be noted in Fig. 1 that the free end of the line carries the hook 8, that the opposite end of the line 7 is attached to the rod or pole 6; that the float 16 is adjustably attached to the line inwardly of the hook and that the sinker is slidable on the line between the float and the rod.

In practice, I thread the sinker 11 on the line in an obvious manner, attach the hook 8 to the free end of the line as usual; then I bring the float into play and clamp the same on the line at a point intervening between the hook 8 on one side, and the sinker 11 on the other side. So far as I know, this ordered assemblage of hooks, float, sinker and rod is a unique combination in a general structural assemblage which, I believe may be generally identified as "fishing tackle."

Also in practice, the float is adjusted to the desired position in relation to the baited hook (flies, spinners, or other artificial bait) illustrated. I then cast the line out into the water and, obviously, the sinker carries it to the bottom. During the casting action, the beveled end of the sinker rides in contact with the float and the float thus constitutes a buffer. The sinker goes to the bottom and lets the line slide freely when the line is slackened for such purpose. The float raises up from the bottom and, obviously, floats downstream. Properly handled, the hook and float-equipped end of the line may be regulated to the desired downstream position and by suitably manipulating the rod and reel, the line is allowed to slide freely through the sinker. This makes it possible to so anchor the line to the bottom, that the line may be pulled back through the sinker or anchor to cause the float to be drawn below water level, or allowed to float atop the water level.

I have found it practical with my equipment to fish in swift water from any angle in relation to the sinker on the bottom. I might state, in this connection, that the bell or beveled ends of the sinker tend to dig into the bottom and thus facilitate maintaining the sinker in a fixed position. The hook-equipped end of the line will rarely, with my equipment, maneuver itself back toward the shore or bank. In still-water fishing, I have found the equipment particularly effective even when high winds are encountered. By simply giving the required slack to the line in still water, the float will climb and may be stopped at any elevation while the sinker, performing as an anchor, remains in place.

When the line is reeled in, the bell end of the sinker next to the float provides an effective abutment and allows the float to abut the sinker with no likelihood of dislodging or displacing the float from the line.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

As a new article of manufacture, a readily attachable, detachable and adjustable float comprising a buoyant body, cylindrical in cross section, a U-shaped bail having its limbs piercing, passing completely through and slidably mounted in said body, said bail having a bight portion projecting beyond one side of the body and line-fastening hooks on the free ends of the limbs projecting beyond a diametrically opposite side of the body, and a cam latch hingedly mounted on said bight portion and engageable with a coacting curvate surface of said body.

WILLIAM A. WEST.

REFERENCES CITED

The following references are of record in the file of this patent:

UNITED STATES PATENTS

| Number | Name | Date |
|---|---|---|
| 701,669 | Atkinson | June 3, 1902 |
| 1,589,522 | Felix | June 22, 1926 |
| 1,802,260 | Kopsho | Apr. 21, 1931 |
| 1,961,539 | White | June 5, 1934 |
| 2,140,724 | Stefan | Dec. 20, 1938 |
| 2,157,819 | Eckert | May 9, 1939 |
| 2,255,853 | Makus et al. | Sept. 16, 1941 |
| 2,263,674 | Casella | Nov. 25, 1941 |
| 2,415,692 | Huston | Feb. 11, 1947 |
| 2,440,989 | Van Brunt | May 4, 1948 |

FOREIGN PATENTS

| Number | Country | Date |
|---|---|---|
| 13,410 | Great Britain | May 30, 1896 |